Sept. 13, 1938.  A. AEPPLI  2,130,055
HELICAL GEAR CUTTING MACHINE
Filed Aug. 28, 1935  2 Sheets-Sheet 2
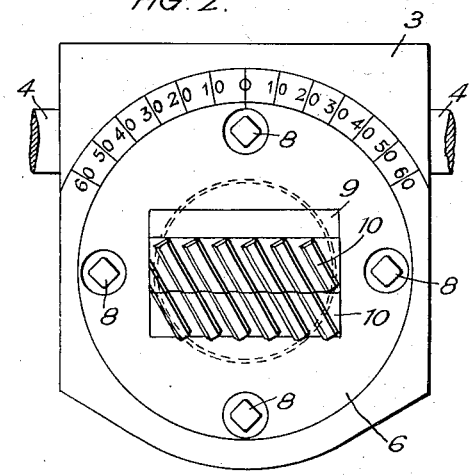
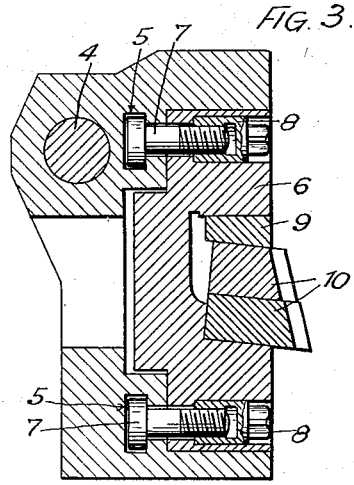
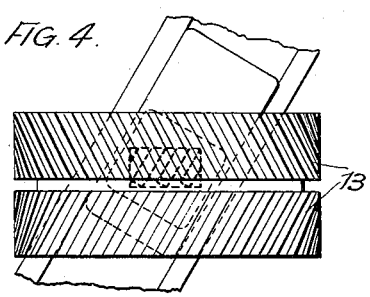
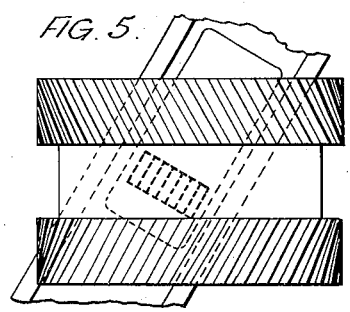
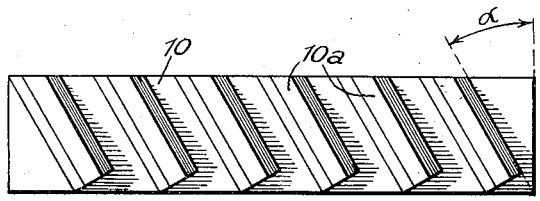
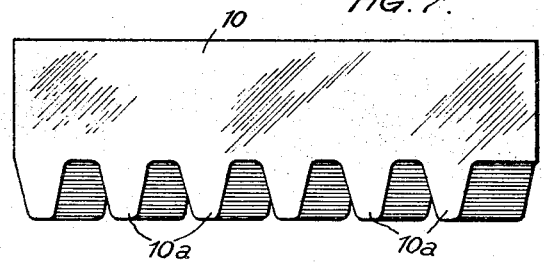
Inventor:
Albert Aeppli
By
Sommers & Young
Attys Patented Sept. 13, 1938

2,130,055

UNITED STATES PATENT OFFICE 2,130,055

HELICAL GEAR CUTTING MACHINE

Albert Aeppli, Zurich, Switzerland, assignor to firm Maag-Zahnrader und-Maschinen A.-G., Zurich, Switzerland Application August 28, 1935, Serial No. 38,268
In Italy September 3, 1934

3 Claims. (Cl. 90—9)

This invention relates to machines for cutting helical gears with adjustable tool holders.

In gear shaping or cutting machines operating with a rack-like tool, a tool holder on the ram member is used for clampingly holding the tool in such a disposition that the teeth of the latter extend parallel to the direction of movement of the ram member. Machines of this type are intended to be used for producing gear wheels the teeth of which are directed parallel to the axis of the wheel (spur gear wheels) as well as inclined thereto (helical gear wheels). When wheels of the latter kind are involved the ram member is adjusted to operate in a direction inclined to the axis of the gear wheel to be worked, so that the direction of cutting of the tool extends tangentially of the helix described on the rolling cylinder.

Thus, if it is required to cut into one and the same gear wheel helical gear teeth of different inclinations situated beside one another as regards the axial direction, such as provided for the so-called herring-bone gears or stepped helical gear wheels it is necessary to allow a certain lost space between adjacent individual steps for the tool to pass in while moving clear of the teeth being worked. The width required for this interstice increases with increase in the angle of inclination of the gear teeth and the length of the tool used. As an interstice of such considerable width unnecessarily increases the total length of the gear and consequently the weight and the cost thereof, it has already been proposed to reduce this interstice to a minimum by appropriately constructing the tool and positioning the same on the ram member.

To this end the rack-like tool has been provided with teeth that are inclined to the longitudinal direction of the tool and the pivotal tool holder support was set at a certain constant angle to the direction of movement of the ram member, so as to permit of cutting the gear teeth in stepped helical gear wheels at a certain angle with a minimum of lost space between the various steps. The use of these arrangements was, however, limited to the angle of inclination as originally selected for the gear teeth once for all.

According to this invention this drawback is eliminated by mounting in the ram member a holder for the rack-like tool in a rotationally adjustable and fixable manner. This arrangement permits setting of a tool with inclined teeth in any possible oblique disposition of the ram member, in such a manner, that the position of the tool i. e. of its longitudinal axis is at all times perpendicular to the axis of the gear wheel to be worked, so that stepped helical gear wheels with any desired inclination of teeth can be produced with a minimum of lost space between adjacent steps.

In the accompanying drawings a constructional form of the invention is illustrated by way of example only, in which Fig. 1 shows a front elevation of a gear cutting machine to which the invention is applied;

Fig. 2 shows a front elevation of the pivotal tool holder support;

Fig. 3 shows a vertical section of Fig. 2;

Figs. 4 and 5 represent schematic illustrations of the disposition of differently arranged tools during working a stepped helical gear wheel by means of the new and old art respectively, the rams being adjusted to an opposite inclination from that of Fig. 1, and the Figs. 6 and 7 show an elevation and a plan view respectively of a rack-like tool.

Figure 1:
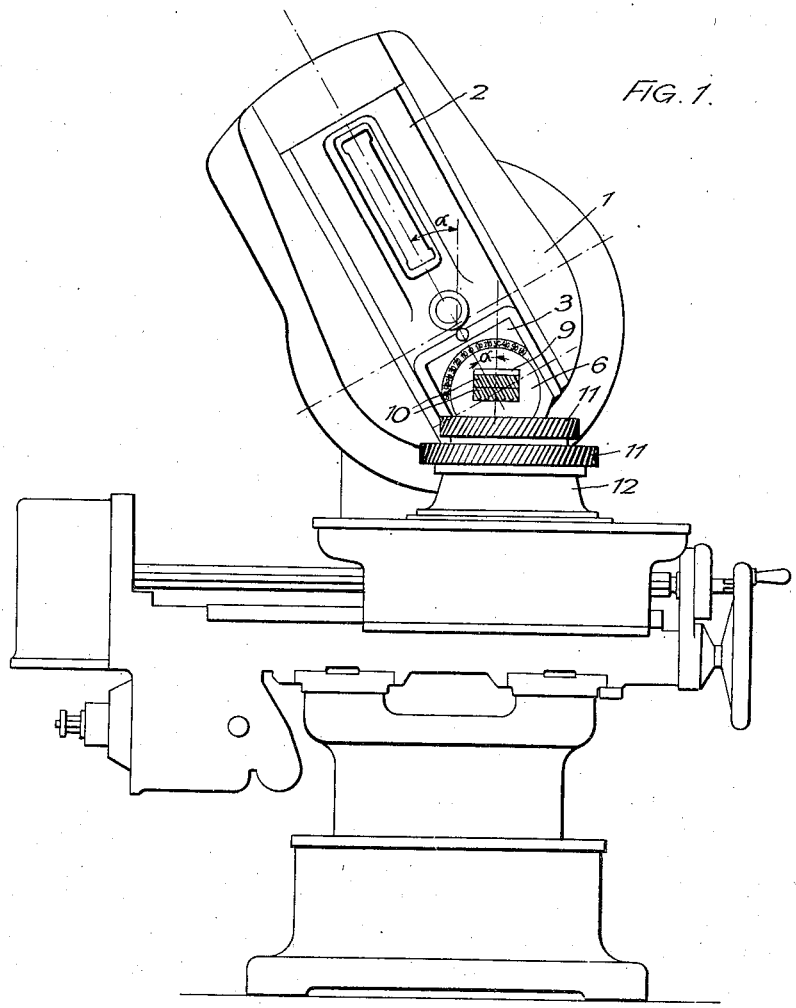

In the gear cutting machine shown in Fig. 1, the head 1 is angularly adjustable about a horizontal axis, so as to be adapted to be set at an angle $\alpha$ to the vertical in accordance with the angle of inclination $\alpha$ for the teeth to be cut in the wheel blank to be worked. By a guide track on the head 1 the ram member 2 is reciprocably guided. In a lower incision of the ram member 2 a pivotal tool holder support 3 is inserted so as to be rockable about a pivot 4, which extends perpendicularly to the guide track of the ram member 2, the holder thus being adapted to slightly rock back and forth during the cutting and the inoperative strokes respectively of the ram member.

The pivotal tool holder support 3 is provided with a cylindrical recess for the reception of a cylindrical tool holder 6 which is adapted to be rocked through this recess about an axis which extends perpendicular to the guide track as well as to the pivot 4. An annular groove 5 of the pivotal support 3 accommodates the heads of four screws 7 which are inserted in corresponding bores of the tool holder 6 to permit of adjusting the latter by means of nuts 8 surrounding the shanks of these screws. Rack-like tools 10 are clampingly held in a depression of the tool holder 6 by means of a wedge 9. The tool holder is in any case so adjusted with respect to the pivotal support 3 that the teeth 10a of the tools 10 are inclined to the vertical by an angle $\alpha$ as required for the gear teeth to be cut and thus extend at all times in the direction of the cutting stroke.

The blank of the stepped helical gear wheel 11 to be worked is clampingly fixed to the work table 12 of the machine and caused to roll on the rack-like tool 10 during the cutting operation. At the end of each cutting stroke applied to the upper toothed rim of the gear wheel all the cutting edges of the cutting teeth 10a of the tool enter into the space between the two toothed rims of the wheel. This intervening space need only be wide enough to provide accommodation for the inclined end faces of the obliquely disposed cutting teeth 10a, as will be seen in Fig. 4 for a herringbone wheel. Thus, the maximum width to be provided for the intervening space is at the most equal to the width of the teeth.

In contradistinction thereto, if the rack-like tool were mounted in the ram member 2 with its longitudinal dimension disposed at right angles to its cutting movement or in other words not perpendicular to the axis of the wheel, as usual for the hitherto known tool holder devices, a space between the toothed rims of a correspondingly large width would ensue and thus an unnecessary increase of the size of the gear, as illustrated in Fig. 5.

I do not limit myself to the particular size, shape, number or arrangement of parts as shown and described, all of which may be varied without going beyond the scope of my invention as shown, described and claimed.

What I claim is:

1. In a headstock arrangement for gear producing machines, a ram guide angularly adjustable into any suitable inclination of gear teeth to be cut, a ram member reciprocable in said guide, a freely rocking recessed clapper support on said member, said support being formed with an undercut annular groove, a cylindrical holder for rack tools mounted in said recess of said support for any angular adjustment of the rack teeth into parallelism with said inclination, and screw means anchored to the portion of the support forming said groove for fixing said holder to said support in position of adjustment of said rack teeth.

2. In a machine for cutting gear teeth, a machine frame, a work holder on the frame, a ram guide mounted on said frame to be angularly adjusted selectively in either direction from the vertical relative to the work holder, a ram mounted in said ram guide, a pivot on said ram extending substantially perpendicularly to the guide, a tool holder support pivotally mounted on said pivot, said tool holder support being provided with an annular tool holder mounting, a tool holder, means for adjustably securing the tool holder with respect to said mounting in any desired angular position of adjustment, and means for securing a tool on said table holder.

3. In a machine for cutting gear teeth on gear wheels by means of rack-like cutting tools, a frame, a ram guide on said frame selectively adjustable in either direction from the vertical into any desired working angle parallel with the longitudinal direction of the gear teeth to be cut, a ram reciprocable on said guide, a clapper on said ram rockable about an axis extending substantially perpendicularly to the direction of working of the ram, a tool holder rotatably mounted on said clapper to be selectively adjustable in either direction from the vertical about an axis perpendicular to the plane of movement of the ram to bring the cutting teeth of a rack-like tool mounted therein into parallelism with the gear teeth to be cut and the longitudinal axis of the tool parallel with a plane perpendicular to the axis of a gear wheel to be produced, said tool holder having a surface for engaging a tool having cutting teeth of any desired inclination to hold the axis of the tool in a definite position relative to said surface, whereby the rotational adjustment of the tool holder also adjusts said axis of the tool.

ALBERT AEPPLI.